United States Patent
Shimazawa et al.

(10) Patent No.: US 7,805,828 B2
(45) Date of Patent: Oct. 5, 2010

(54) METHOD OF MANUFACTURING THIN-FILM MAGNETIC HEAD

(75) Inventors: Koji Shimazawa, Chuo-ku (JP); Yoshihiro Tsuchiya, Chuo-ku (JP)

(73) Assignee: TDK Corporation, Tokyo (JP)

( * ) Notice: Subject to any disclaimer, the term of this patent is extended or adjusted under 35 U.S.C. 154(b) by 728 days.

(21) Appl. No.: 11/752,888

(22) Filed: May 23, 2007

(65) Prior Publication Data

US 2007/0223147 A1 Sep. 27, 2007

Related U.S. Application Data

(62) Division of application No. 10/902,056, filed on Jul. 30, 2004, now abandoned.

(30) Foreign Application Priority Data

Aug. 7, 2003 (JP) ............... 2003-289269

(51) Int. Cl.
G11B 5/187 (2006.01)
C21D 1/04 (2006.01)

(52) U.S. Cl. ............ 29/603.08; 29/603.14; 148/108; 148/121; 428/811; 360/319; 360/324.11; 360/317

(58) Field of Classification Search ......... 29/603.08, 29/603.13, 603.14; 148/108, 121; 428/811, 428/812, 815.2; 360/313, 319, 324.1, 324.11, 360/324.12, 324.2, 327.22, 317
See application file for complete search history.

(56) References Cited

U.S. PATENT DOCUMENTS

| 5,206,590 | A |   | 4/1993 | Dieny et al. |   |
|---|---|---|---|---|---|
| 5,315,468 | A |   | 5/1994 | Lin et al. |   |
| 5,422,571 | A |   | 6/1995 | Gurney et al. |   |
| 5,774,309 | A | * | 6/1998 | Uno et al. | 360/327.22 |
| 5,784,225 | A |   | 7/1998 | Saito et al. |   |
| 5,898,548 | A | * | 4/1999 | Dill et al. | 360/324.2 |
| 5,974,657 | A | * | 11/1999 | Fox et al. | 29/603.08 |
| 5,989,690 | A |   | 11/1999 | Fujikata et al. |   |
| 6,090,498 | A |   | 7/2000 | Omata et al. |   |
| 6,093,444 | A |   | 7/2000 | Miyauchi et al. |   |
| 6,278,590 | B1 |   | 8/2001 | Gill et al. |   |
| 6,455,178 | B1 |   | 9/2002 | Fuke et al. |   |
| 6,500,570 | B2 |   | 12/2002 | Hasegawa et al. |   |

(Continued)

FOREIGN PATENT DOCUMENTS

JP    A-06-076247    3/1994

(Continued)

Primary Examiner—A. Dexter Tugbang
(74) Attorney, Agent, or Firm—Oliff & Berridge, PLC

(57) ABSTRACT

A method of manufacturing a thin-film magnetic head including forming the first shield layer; forming the magnetoresistive device, carried out after forming the first shield layer, a heat treatment providing exchange coupling between the ferromagnetic layer and the antiferromagnetic layer so as to magnetize the ferromagnetic layer in a predetermined direction; forming the domain control layer so as to hold the magnetoresistive device in a track width direction; magnetizing the domain control layer in a direction yielding a magnetic field in the same direction as with a magnetic field received by the ferromagnetic layer upon exchange-coupling with the antiferromagnetic layer, forming the second shield layer, carried out after magnetizing the domain control layer, and remagnetizing the domain control layer in a direction yielding the longitudinal bias magnetic field, carried out after forming the second shield layer.

5 Claims, 11 Drawing Sheets

U.S. PATENT DOCUMENTS

| | | | |
|---|---|---|---|
| 6,545,848 B1 * | 4/2003 | Terunuma | 360/324.12 |
| 2002/0126423 A1 | 9/2002 | Terunuma et al. | |

FOREIGN PATENT DOCUMENTS

| JP | A-06-236527 | 8/1994 |
|---|---|---|
| JP | B2-8-21166 | 3/1996 |
| JP | A-09-050611 | 2/1997 |
| JP | A-09-063021 | 3/1997 |
| JP | A-09-082524 | 3/1997 |
| JP | A-09-147325 | 6/1997 |
| JP | A-09-148132 | 6/1997 |
| JP | A-09-167318 | 6/1997 |
| JP | A-10-242544 | 9/1998 |
| JP | A-11-175923 | 7/1999 |
| JP | 2000099925 A * | 4/2000 |
| JP | A-2000-137906 | 5/2000 |
| JP | 2001-256620 | 9/2001 |
| JP | A-2002-185059 | 6/2002 |
| JP | A-2002-208119 | 7/2002 |

* cited by examiner

METHOD OF MANUFACTURING THIN-FILM MAGNETIC HEAD

This application is a divisional of application Ser. No. 10/902,056, filed Jul. 30, 2004, which application is incorporated herein by reference in its entirety.

BACKGROUND OF THE INVENTION

1. Field of the Invention

The present invention relates to a method of manufacturing a thin-film magnetic head.

2. Related Background of the Invention

Recently, as hard disk drives (HDD) have been attaining a higher density, magnetic heads with a higher sensitivity and a higher output have been in demand. For responding to such a demand, a thin-film magnetic head comprising a magnetoresistive device (hereinafter referred to as MR device) utilizing a spin-valve film, which is one of devices exhibiting a giant magnetoresistive effect, has been proposed (see, for example, Japanese Patent Publication No. HEI 8-21166 and Japanese Patent Application Laid-Open No. HEI 6-236527). The spin-valve film comprises a sandwich structure in which two ferromagnetic layers are magnetically separated from each other by a nonmagnetic layer. An antiferromagnetic layer is laminated on one of the ferromagnetic layers, so that an exchange-coupling magnetic field generated in their interface is applied to this ferromagnetic layer (the layer to be pinned, which will be referred to as pinned layer in this specification). Magnetic fields to be magnetically reversed differ between the pinned layer receiving the exchange-coupling magnetic field and the other ferromagnetic layer (referred to as free layer in the specification) not receiving the exchange-coupling magnetic field. Therefore, magnetization directions of the two ferromagnetic layers holding the nonmagnetic layer change from parallel to nonparallel, whereby electrical resistivity shifts greatly, thus yielding a giant magnetoresistive effect.

For improving the reliability of the thin-film magnetic head, it is necessary for the antiferromagnetic layer and the pinned layer to exhibit a sufficiently high exchange-coupling force. It has therefore been known to use PtMn alloys (see, for example, Japanese Patent Application Laid-Open No. HEI 9-147325) and NiMn alloys (see, for example, Japanese Patent Application Laid-Open Nos. HEI 9-63021 and HEI 9-50611), which yield a very strong exchange-coupling force, as a material for the antiferromagnetic layer.

Meanwhile, the thin-film magnetic head is required to read recording media in which information is recorded with a higher density. This necessitates so-called gap narrowing in which the gap between a pair of magnetic shield layers disposed at positions holding the spin-valve film therebetween in the thin-film magnetic head is narrowed. Among the layers disposed between the magnetic shield layers, the insulating layer is hard to make thinner than that currently available. Therefore, it is necessary for the spin-valve film to reduce the thickness. For thinning the spin-valve film, it will be effective if the thickness of the antiferromagnetic layer, which is thicker than the other layers, is reduced.

When a PtMn alloy or NiMn alloy, which is an ordered alloy (a material requiring an ordered atom arrangement in order to exhibit an antiferromagnetic characteristic), is used as a material for the antiferromagnetic layer, a thickness of 10 nm or more is necessary for attaining sufficient exchange coupling and heat resistance characteristics, which cannot respond to the demand for gap narrowing. It has therefore been known to use IrMn alloys (see, for example, Japanese Patent Application Laid-Open Nos. HEI 6-76247 and HEI 9-148132), RuRhMn alloys (see, for example, Japanese Patent Application Laid-Open Nos. HEI 10-242544), and the like, which can attain a sufficient exchange-coupling force even at a small thickness of 10 nm or less, as a material for the antiferromagnetic layer.

SUMMARY OF THE INVENTION

However, IrMn alloys and RuRhMn alloys may be problematic in that their blocking temperature is lower than that of PtMn alloys (about 380° C.), so that their thermal stability is not sufficient. When an IrMn alloy is used as a material for the antiferromagnetic layer, for example, the exchange-coupling force remarkably deteriorates in an atmosphere at a temperature of about 250° C.

In a process of manufacturing a thin-film magnetic head, heat treatment at a temperature of 200° to 300° C. (a step of thermally curing a resist, or the like) is usually carried out in the process of manufacturing a recording head part. Here, a domain control layer for regulating magnetic domains of the free layer by applying a longitudinal bias magnetic field thereto has already been magnetized and disposed on both sides of the MR device. Therefore, the heat treatment is carried out in a state where the longitudinal bias magnetic field is applied in a direction perpendicular to the direction of the exchange-coupling magnetic field received by the pinned layer. Also, in a step of forming an electrode layer (made of Au, for example) for supplying a sense current to the free layer, the electrode layer may be heat-treated (at a temperature of 250° to 300° C.) in the air in order to prevent the electrode layer from causing electromigration.

Therefore, when heat treatment is carried out at a temperature near the blocking temperature or higher in a state where the domain control layer is formed and magnetized, the exchange-coupling force between the pinned layer and the antiferromagnetic layer may deteriorate remarkably, so that the direction of the exchange-coupling magnetic field received by the pinned layer may tilt under the influence of the longitudinal bias magnetic field from the domain control layer. When the direction of the exchange-coupling magnetic field received by the pinned layer is disturbed as such, deterioration in head output, deterioration in symmetry of output waveforms, etc. may occur.

In view of the points mentioned above, it is an object of the present invention to provide a method of manufacturing a thin-film magnetic head which can prevent the direction of the exchange-coupling magnetic field from being disturbed even when a material having a low blocking temperature is used in the antiferromagnetic layer included in the MR device.

In one aspect, the present invention provides a method of manufacturing a thin-film magnetic head comprising a magnetoresistive device including an antiferromagnetic layer, a ferromagnetic layer whose direction of magnetization is fixed upon exchange-coupling with the antiferromagnetic layer, a free layer whose direction of magnetization changes in response to external magnetization, and a nonmagnetic layer disposed between the ferromagnetic layer and the free layer; a domain control layer for regulating a magnetic domain of the free layer by applying a longitudinal bias magnetic field thereto; and first and second shield layers, disposed so as to oppose each other by way of the magnetoresistive device, for shielding the magnetoresistive device; the method comprising a step of forming the first shield layer; a step of forming the magnetoresistive device, carried out after the step of forming the first shield layer; a heat treatment step of providing exchange coupling between the ferromagnetic layer and the antiferromagnetic layer so as to magnetize the ferromagnetic layer in a predetermined direction; a step of forming the domain control layer so as to hold the magnetoresistive device in a track width direction; a step of forming the second shield layer, carried out after the step of forming the domain control layer; and a step of magnetizing the domain control layer in a direction yielding the longitudinal bias magnetic field, carried out after the step of forming the second shield layer.

In the method of manufacturing a thin-film magnetic head in accordance with this aspect of the present invention, after forming the second shield layer, the domain control layer is magnetized in a direction yielding the longitudinal bias magnetic field in particular. Therefore, the longitudinal bias magnetic field from the domain control layer is weakened by the first and second shield layers, so as to be less influential on the magnetoresistive device. As a result, even if heat treatment is carried out at a temperature near the blocking temperature or higher in a state where the domain control layer is formed and magnetized, the direction of the exchange-coupling magnetic field received by the ferromagnetic layer can be prevented from being disturbed, whereby the thin-film magnetic head can attain a higher reproducing output.

Preferably, the method of manufacturing a thin-film magnetic head in accordance with this aspect of the present invention further comprises a step of forming a recording head part, whereas the step of magnetizing the domain control layer is carried out prior to the step of forming the recording head part.

In the method of manufacturing a thin-film magnetic head in accordance with this aspect of the present invention, a plurality of thin-film magnetic heads may be formed so as to be arranged in a matrix on a wafer. Preferably, in this case, the method of manufacturing a thin-film magnetic head in accordance with this aspect of the present invention further comprises a step of cutting the wafer into a plurality of bars each comprising a plurality of thin-film magnetic heads arranged integrally, whereas the step of magnetizing the domain control layer is carried out prior to the step of cutting the wafer.

In another aspect, the present invention provides a method of manufacturing a thin-film magnetic head comprising a magnetoresistive device including an antiferromagnetic layer, a ferromagnetic layer whose direction of magnetization is fixed upon exchange-coupling with the antiferromagnetic layer, a free layer whose direction of magnetization changes in response to external magnetization, and a nonmagnetic layer disposed between the ferromagnetic layer and the free layer; a domain control layer for regulating a magnetic domain of the free layer by applying a longitudinal bias magnetic field thereto; and first and second shield layers, disposed so as to oppose each other by way of the magnetoresistive device, for shielding the magnetoresistive device; the method comprising a step of forming the first shield layer; a step of forming the magnetoresistive device, carried out after the step of forming the first shield layer; a heat treatment step of providing exchange coupling between the ferromagnetic layer and the antiferromagnetic layer so as to magnetize the ferromagnetic layer in a predetermined direction; a step of forming the domain control layer so as to hold the magnetoresistive device in a track width direction; a step of magnetizing the domain control layer in a direction yielding a magnetic field in the same direction as with a magnetic field received by the ferromagnetic layer upon exchange-coupling with the antiferromagnetic layer; a step of forming the second shield layer, carried out after the step of magnetizing the domain control layer; and a step of remagnetizing the domain control layer in a direction yielding the longitudinal bias magnetic field, carried out after the step of forming the second shield layer.

In the method of manufacturing a thin-film magnetic head in accordance with this aspect of the present invention, exchange coupling is provided between the ferromagnetic layer and antiferromagnetic layer, and the domain control layer is magnetized in a direction yielding a magnetic field in the same direction as with the magnetic field (exchange-coupling magnetic field) received by the ferromagnetic layer upon exchange-coupling with the antiferromagnetic layer. Therefore, the magnetic field from the domain control layer and the exchange-coupling magnetic field received by the ferromagnetic layer are oriented in the same direction. This can prevent the direction of the exchange-coupling magnetic field from being disturbed even when heat treatment is carried out at a temperature near the blocking temperature or higher, so that the thin-film magnetic head can attain a higher reproducing output.

In this aspect of the present invention, after the second shield layer is formed, the domain control layer is remagnetized in a direction yielding the longitudinal bias magnetic field. Therefore, the longitudinal magnetic field from the domain control layer is weakened by the first and second shield layers, so as to become less influential on the magnetoresistive device. As a result, even if heat treatment is carried out at a temperature near the blocking temperature or higher in a state where the domain control layer is formed and magnetized, the direction of the exchange-coupling magnetic field received by the ferromagnetic layer can be prevented from being disturbed.

Preferably, the method of manufacturing a thin-film magnetic head in accordance with this aspect of the present invention further comprises a step of forming a recording head part, wherein the step of remagnetizing the domain control layer is carried out prior to the step of forming the recording head part.

In the method of manufacturing a thin-film magnetic head in accordance with this aspect of the present invention, a plurality of thin-film magnetic heads may be formed so as to be arranged in a matrix on a wafer. Preferably, in this case, the method of manufacturing a thin-film magnetic head in accordance with this aspect of the present invention further comprises a step of cutting the wafer into a plurality of bars each comprising a plurality of thin-film magnetic heads arranged integrally, wherein the step of remagnetizing the domain control layer is carried out prior to the step of cutting the wafer.

Preferably, in the methods of manufacturing a thin-film magnetic head in accordance with the present invention, the antiferromagnetic layer is made of an IrMn alloy.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions.

Figure 1A:
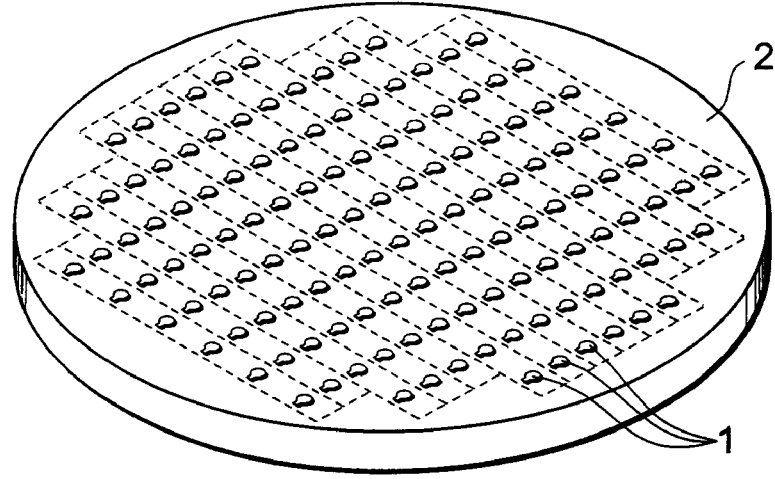
FIG. 1A is a view showing thin-film magnetic heads in accordance with an embodiment of the present invention in a state formed on a support.
Figure 1B:
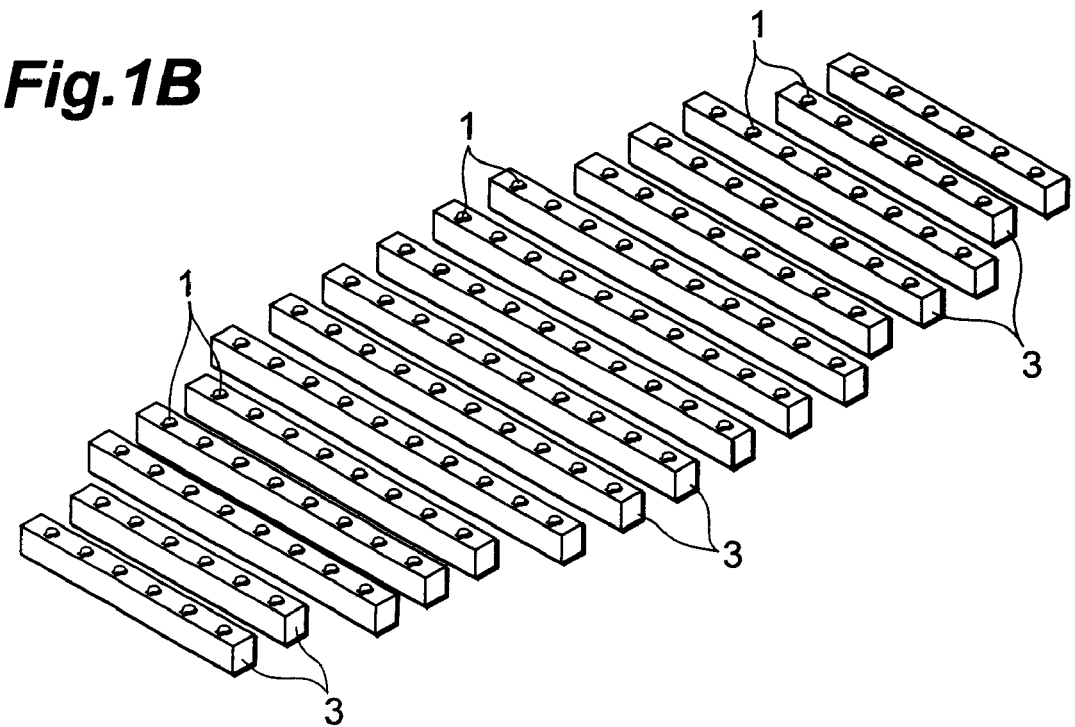
FIG. 1B is a view showing a state where the support is cut, so as to produce a plurality of magnetic head bars each comprising thin-film magnetic heads arranged in a row.

First, the configuration of the thin-film magnetic head in accordance with an embodiment of the present invention will be explained. FIG. 1A is a view showing a state where a plurality of thin-film magnetic heads in accordance with this embodiment are formed on a support. FIG. 1A illustrates a state where the thin-film magnetic heads 1 are formed on a single support 2 (wafer) made of AlTiC ($Al_2O_3 \cdot TiC$) or the like. FIG. 1B shows a state where the support 2 is cut into a plurality of magnetic head bars (hereinafter referred to as bars) 3 each comprising the thin-film magnetic heads 1 arranged in a row.

Figure 2:
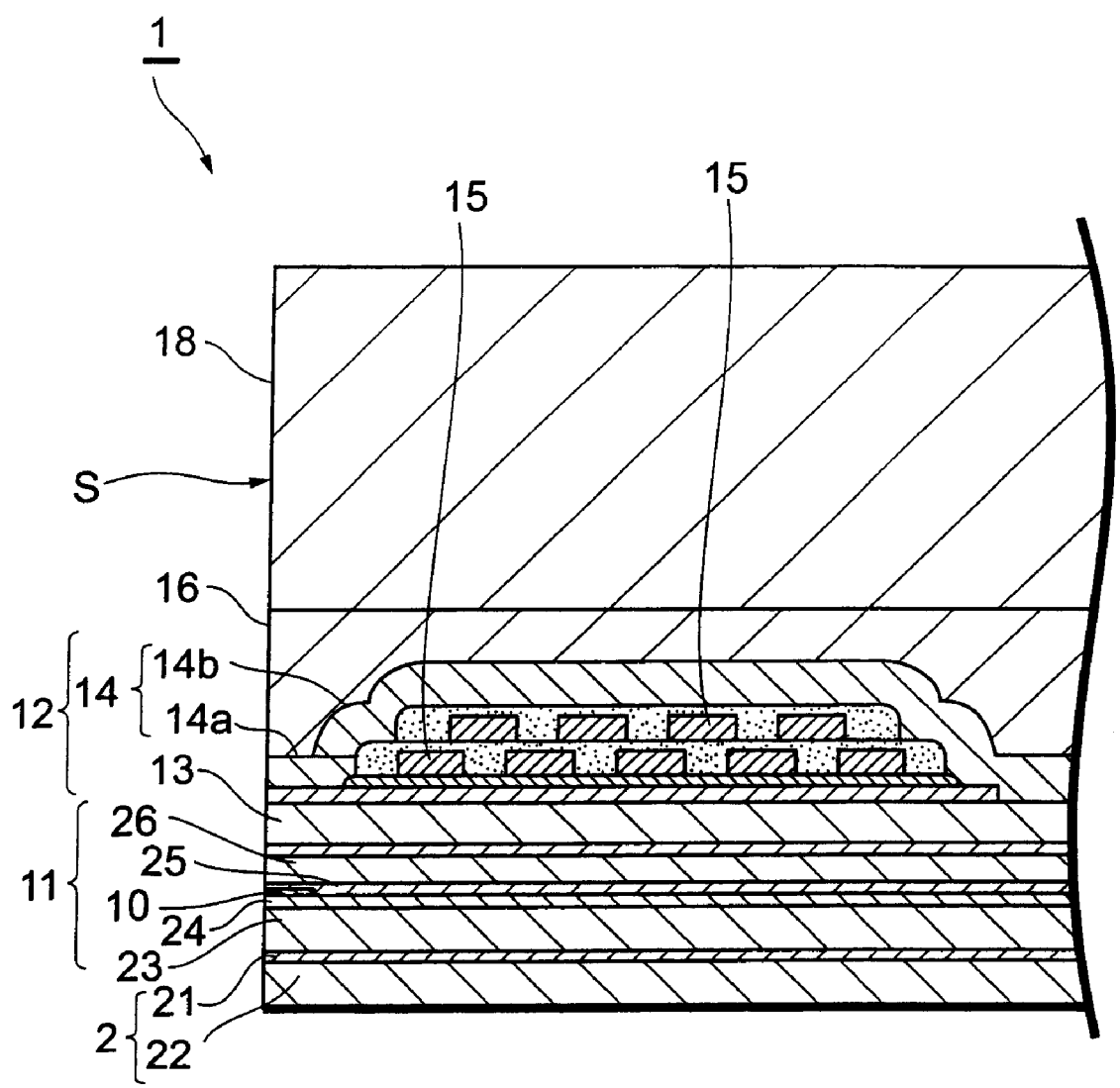
FIG. 2 is a schematic sectional view of the bar shown in FIG. 1B, taken along a direction perpendicular to a medium-opposing surface in the thin-film magnetic head.

FIG. 2 is a schematic sectional view of the bar 3 shown in FIG. 1B, taken along a direction perpendicular to a medium-opposing surface S in the thin-film magnetic head 1. The thin-film magnetic head 1 shown in FIG. 2 is a composite thin-film magnetic head in which a reproducing head part 11 having a reproducing MR device 10 and a recording head part 12 as an inductive electromagnetic transducer for writing are laminated on the support 2. The medium-opposing surface S is a surface opposing the recording surface of a hard disk, and is referred to as air bearing surface (ABS) in general. Here, words "upper" and "lower" conform to those in each of FIGS. 2 and 3, respectively.

The support 2 is constituted by a substrate 22 made of AlTiC ($Al_2O_3 \cdot TiC$) or the like, and a base layer 21 made of an insulating material such as alumina ($Al_2O_3$) formed thereon. Formed on the base layer 21 is a lower shield layer 23 (first shield layer). The lower shield layer 23 is formed from a soft magnetic substance such as NiFe, Sendust, CoFe, or FeCoNi. Formed on the lower shield layer 23 is a lower gap layer 24. The lower gap layer 24 is formed from a nonmagnetic insulator such as $Al_2O_3$, AlN, or $SiO_2$.

Formed on the lower gap layer 24 is an MR device 10. An upper gap layer 25 is formed on the MR device 10 and the lower gap layer 24. As with the lower gap layer 24, the upper gap layer 25 is formed from a nonmagnetic insulator such as $Al_2O_3$, AlN, or $SiO_2$. Formed on the upper gap layer 25 is an upper shield layer 26 (second shield layer). As with the lower shield layer 23, the upper shield layer 26 is formed from a soft magnetic substance such as NiFe, Sendust, CoFe, or FeCoNi. Each of the shield layers 23, 26 is made of a soft magnetic material, and thus restrains leakage magnetic fluxes other than those from magnetization transient areas of an object to be detected (magnetic recording medium) from being introduced into the MR device 10.

Figure 3:
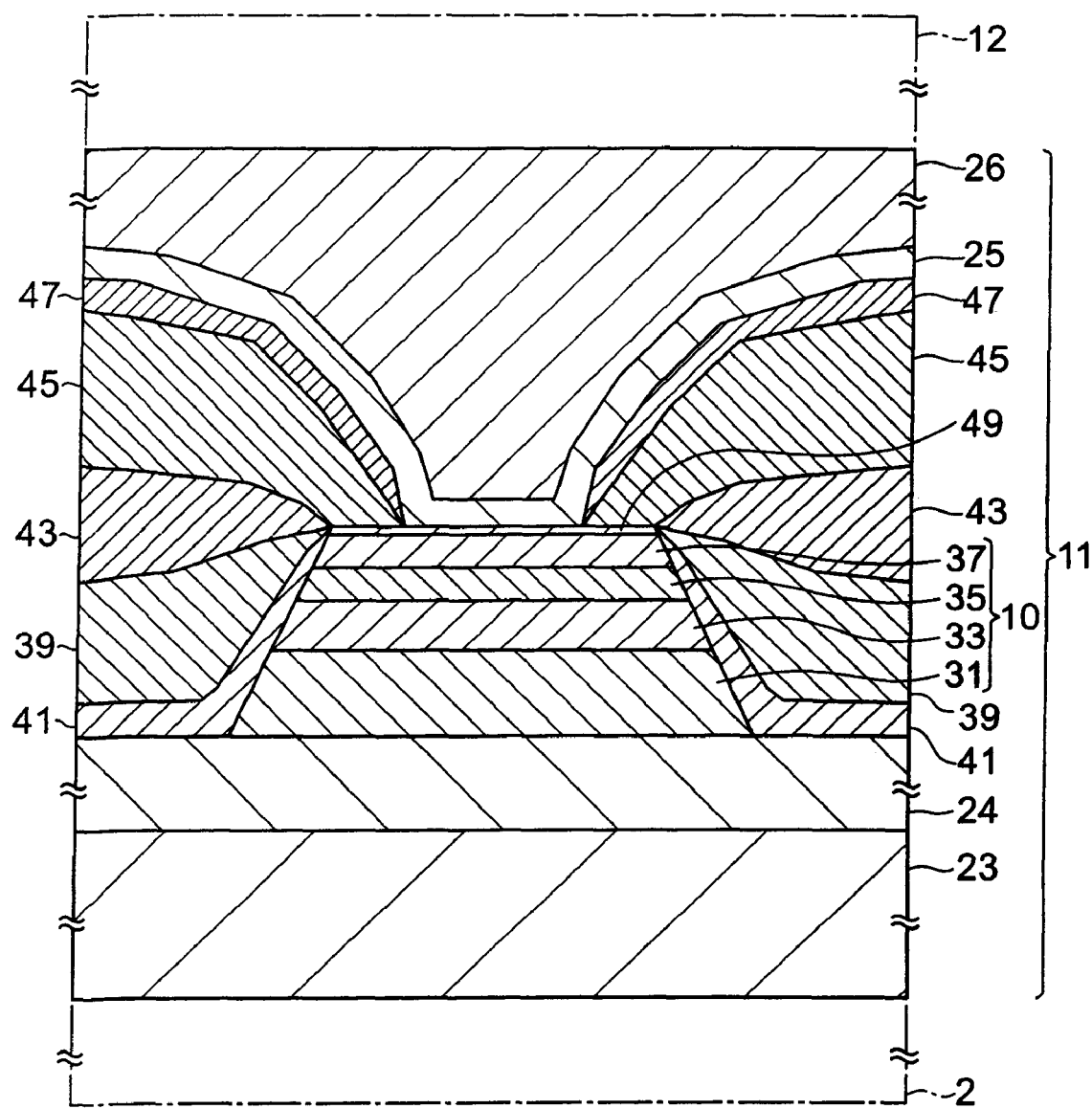
FIG. 3 is a schematic sectional view of the bar shown in FIG. 1B, taken along a direction parallel to the medium-opposing surface in the thin-film magnetic head.

The MR device 10 is a GMR (Giant MagnetoResistive) device, and includes an antiferromagnetic layer 31, a pinned layer (ferromagnetic layer) 33, a nonmagnetic layer 35, and a free layer 37 as shown in FIG. 3. FIG. 3 is a schematic sectional view of the bar shown in FIG. 1B, taken along a direction parallel to the medium-opposing surface in the thin-film magnetic head.

The MR device 10 is constituted by forming and laminating thin films of an antiferromagnetic layer 31, a pinned layer 33, a nonmagnetic layer 35, and a free layer 37 on the lower gap layer 24 in succession, and patterning them (for which techniques such as ion milling and RIE can be utilized). Exchange coupling occurs in the interface between the antiferromagnetic layer 31 and the pinned layer 33, whereby the magnetic field (exchange-coupling magnetic field) received by the pinned layer 33 is fixed to a predetermined direction (direction orthogonal to the track width). On the other hand, the magnetization direction of the free layer 37 changes depending on the leakage magnetic field from the magnetic recording medium, i.e., external magnetic field.

The antiferromagnetic layer 31 is made of an IrMn alloy, and is formed on the lower gap layer 24. The thickness of the antiferromagnetic layer 31 is set to 4 to 6 mm. The IrMn alloy is an antiferromagnetic disordered alloy mainly including a face-centered cubic (FCC) structure. The pinned layer 33 is made of a ferromagnetic substance such as Fe, Co, Ni, NiFe, CoFe, CoZrNb, or FeCoNi, and is formed on the antiferromagnetic layer 31. The thickness of the pinned layer 33 is set to 0.5 to 5.0 nm. The nonmagnetic layer 35 is made of a nonmagnetic substance such as Cu, Ru, Ir, Rh, Au, or Ag, and is formed on the pinned layer 33. The thickness of the nonmagnetic layer 35 is set to 0.1 to 4.0 nm. The free layer 37 is made of a ferromagnetic substance such as Fe, Co, Ni, NiFe, CoFe, CoZrNb, or FeCoNi, and is formed on the nonmagnetic layer 35. The thickness of the free layer 37 is set to 0.5 to 5.0 nm.

A domain control layer 39 for applying a longitudinal bias magnetic field to the free layer 37 is formed so as to hold the MR device 10 in a track width direction. The magnetization direction of the free layer 37 is parallel to the track width direction because of the longitudinal bias magnetic field from the domain control layer 39, and thus is orthogonal to the magnetization direction of the pinned layer 33. The domain control layer 39 is made of a hard magnetic substance having a high coercive force such as CoCrPt, CoPt, or CoTa, and is disposed on both flanks of the MR device 10 by way of a base layer 41. The base layer 41 is made of a metal material such as TiW, Ta, or CrTi, and is formed on side portions of the MR device 10 and the lower gap layer 24. A protective layer 43, which is made of Ta, $Al_2O_3$, or the like, is formed on the domain control layer 39.

The free layer 37 is flanked by electrode layers 45 which are separated from each other while overlying the free layer 37. The electrode layers 45 supply a current (sense current) to the free layer 37. The electrode layers 45 are made of a conductive material such as Au or Ag. Protective layers 47, which are made of Ta, $Al_2O_3$, or the like, are formed on the electrode layers 45. Electrons supplied from one electrode layer 45 are transmitted to the other electrode layer 45 by way of the free layer 37. The current flows in a direction opposite from that of the electron migration.

The upper gap layer 25 is formed on the protective layers 47 and a protective layer 49 formed on the MR device 10. Formed on the upper gap layer 25 is the upper shield layer 26.

Reference will be made to FIG. 2 again. The recording head part 12 employs so-called in-plane recording scheme, and mainly comprises a lower magnetic pole 13, an upper magnetic pole 14 holding the lower magnetic pole 13 between the upper magnetic pole 14 and the MR device 10 and being magnetically connected to the lower magnetic pole 13, and a thin-film coil 15 partly positioned between the lower magnetic pole 13 and the upper magnetic pole 14.

The upper magnetic pole 14 is constituted by a magnetic pole part layer 14a positioned on the medium-opposing surface S side, and a yoke part layer 14b connected thereto while bypassing the thin-film coil 15 thereunder. The magnetic pole part layer 14a and the yoke part layer 14b may be integrated together as well. An overcoat layer 16 is formed on the upper magnetic pole 14.

Similarly, two conductive parts (not depicted) made of a conductive material are electrically connected to each of the reproducing head part 11 and recording head part 12, while having upper end parts connected to their corresponding reproducing or recording electrode pads.

Though the words "soft magnetic" and "hard magnetic" mentioned above define magnitudes of coercive force, a material may include substances or structures outside of its definition microscopically or in specific regions, for example, as long as they exhibit a "soft magnetic" or "hard magnetic" function as a whole. For instance, materials having different magnetic characteristics may be magnetically exchange-coupled or those partly including a nonmagnetic substance can be employed if they exhibit a soft or hard magnetic function as a whole.

The function of the thin-film magnetic head 1 will now be explained. The free layer 37 is turned into a single magnetic domain in the track width direction by the longitudinal bias magnetic field from the domain control layer 39. The magnetization direction of the free layer 37 changes depending on the leakage magnetic field from a magnetization transient area, i.e., whether the magnetization transient area is the north or south pole. Since the magnetization direction of the pinned layer 33 is fixed by the antiferromagnetic layer 31, the electron transmission rate (current) between a pair of electrode layers 45 varies because of the change in resistance corresponding to the cosine between the respective magnetization directions of the free layer 37 and pinned layer 33. When the change in current is detected, the leakage magnetic flux from the magnetization transient area to be detected in the magnetic recording medium is obtained. Magnetic recording of data will now be explained in brief. Namely, writing into magnetization transient areas is carried out by the leakage magnetic flux from the recording head part.

A method of manufacturing the thin-film magnetic head 1 configured as mentioned above will now be explained with reference to FIGS. 4 to 7. FIGS. 4 to 7 are flowcharts for explaining examples of the method of manufacturing a thin-film magnetic head in accordance with this embodiment. The method of manufacturing the thin-film magnetic head 1 in this embodiment is substantially the same as common manufacturing methods except for the step of magnetizing the domain control layer 39 and the like. Therefore, only major steps will be explained.

An example of method of manufacturing the thin-film magnetic head 1 will be explained with reference to FIG. 4.

The lower shield layer 23 is formed by sputtering, plating, or the like (S101).

Subsequently, the MR device 10 is formed by sputtering or the like (S103).

Then, pinning/annealing is carried out, so as to provide exchange coupling between the antiferromagnetic layer 31 and the pinned layer 33 (S105). The pinning/annealing is effected by applying a temperature of 250° to 300° C. while a predetermined magnetic field (e.g., at about 8 kOe) is exerted in a direction orthogonal to the track width direction, and holding and lowering the temperature over a predetermined period of time (e.g., about 3 hours). This temperature lowering process in the magnetic field exerts the magnetic field in a direction to be pinned at a temperature not higher than the blocking temperature of the antiferromagnetic layer 31, whereby exchange coupling occurs between the antiferromagnetic layer 31 and the pinned layer 33.

Thereafter, the domain control layer 39 and the electrode layers 45 are formed by sputtering or the like (S107). Here, in order to prevent the electrode layers 45 from causing electromigration, the electrode layers 45 are heat-treated in the air (at a temperature of 250° to 300° C.).

Subsequently, the upper shield layer 26 is formed by sputtering, plating, or the like (S109).

Then, the domain control layer 39 is magnetized in a direction in which a longitudinal bias magnetic field is attained (S111). The domain control layer 39 is magnetized by applying a predetermined magnetic field (e.g., at about 12 kOe) thereto in the track width direction at room temperature.

Thereafter, the recording head part 12 is formed (S113). Here, a temperature of 200° to 300° C. is applied in order to cure the resist for forming the first and second layers of the insulating film in the thin-film coil 15.

Next, the support 2 in which a plurality of thin-film magnetic heads 1 are formed so as to be arranged in a matrix is cut into a plurality of bars 3 each comprising a plurality of thin-film magnetic heads 1 arranged integrally (S115). Subsequent manufacturing steps are totally the same as those in the conventional cases.

In the manufacturing method mentioned above, the domain control layer 39 is magnetized in a direction yielding a longitudinal bias magnetic field after the upper shield layer 26 is formed and before the recording head part 12 is formed. Therefore, the longitudinal bias magnetic field from the domain control layer 39 is weakened by the lower shield layer 23 and the upper shield layer 26, so as to become less influential on the MR device 10. This can prevent the direction of the exchange-coupling magnetic field received by the pinned layer 33 from being disturbed even when heat treatment is carried out at a temperature near the blocking temperature or higher in the step of forming the recording head part 12 while in the state where the domain control layer 39 is formed and magnetized.

It will be preferred if the temperature applied before forming the upper shield layer 26 is lower than the blocking temperature of an IrMn alloy (e.g., not higher than 200° C.).

Next, with reference to FIG. 5, another example of method of manufacturing the thin-film magnetic head 1 will be explained. The steps identical to those in the method shown in FIG. 4 will not be explained.

Figure 5:
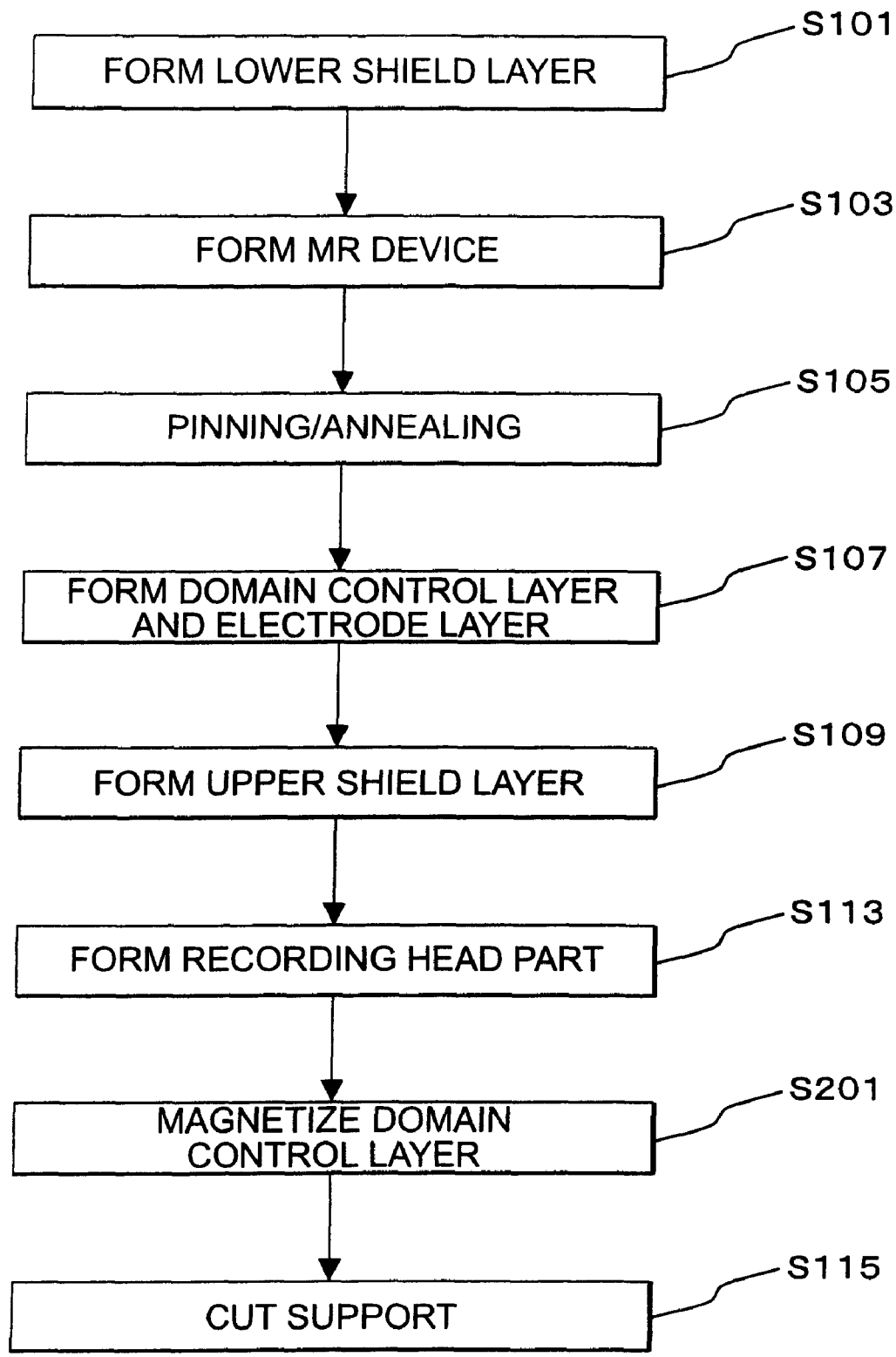
FIG. 5 is a flowchart for explaining an example of the method of manufacturing a thin-film magnetic head in accordance with the embodiment.

In this example, as shown in FIG. 5, the domain control layer 39 is magnetized in a direction yielding a longitudinal bias magnetic field (S201) after the recording head part 12 is formed. The domain control layer 39 is magnetized by applying a predetermined magnetic field (e.g., at about 12 kOe) thereto in a track width direction at room temperature.

Then, the support 2 in which a plurality of thin-film magnetic heads 1 are arranged in a matrix is cut into a plurality of bars 3 each comprising a plurality of thin-film magnetic heads 1 arranged integrally (S115). Subsequent manufacturing steps are totally the same as those in the conventional cases.

In the manufacturing method mentioned above, the domain control layer 39 is magnetized in a direction yielding a longitudinal bias magnetic field after the upper shield layer 26 is formed and before the support 2 is cut into the bars 3. Hence, the domain control layer 39 is magnetized after heat treatment operations (the heat treatment for preventing the electrode layers 45 from causing electromigration, the process of thermally curing the resist in the step of forming the recording head part 12, etc.) at a temperature near the blocking temperature or higher. This can reliably prevent the direction of the exchange-coupling magnetic field received by the pinned layer 33 from being disturbed.

Next, with reference to FIG. 6, another example of method of manufacturing the thin-film magnetic head 1 will be explained. The steps identical to those in the method shown in FIG. 4 will not be explained.

Figure 6:
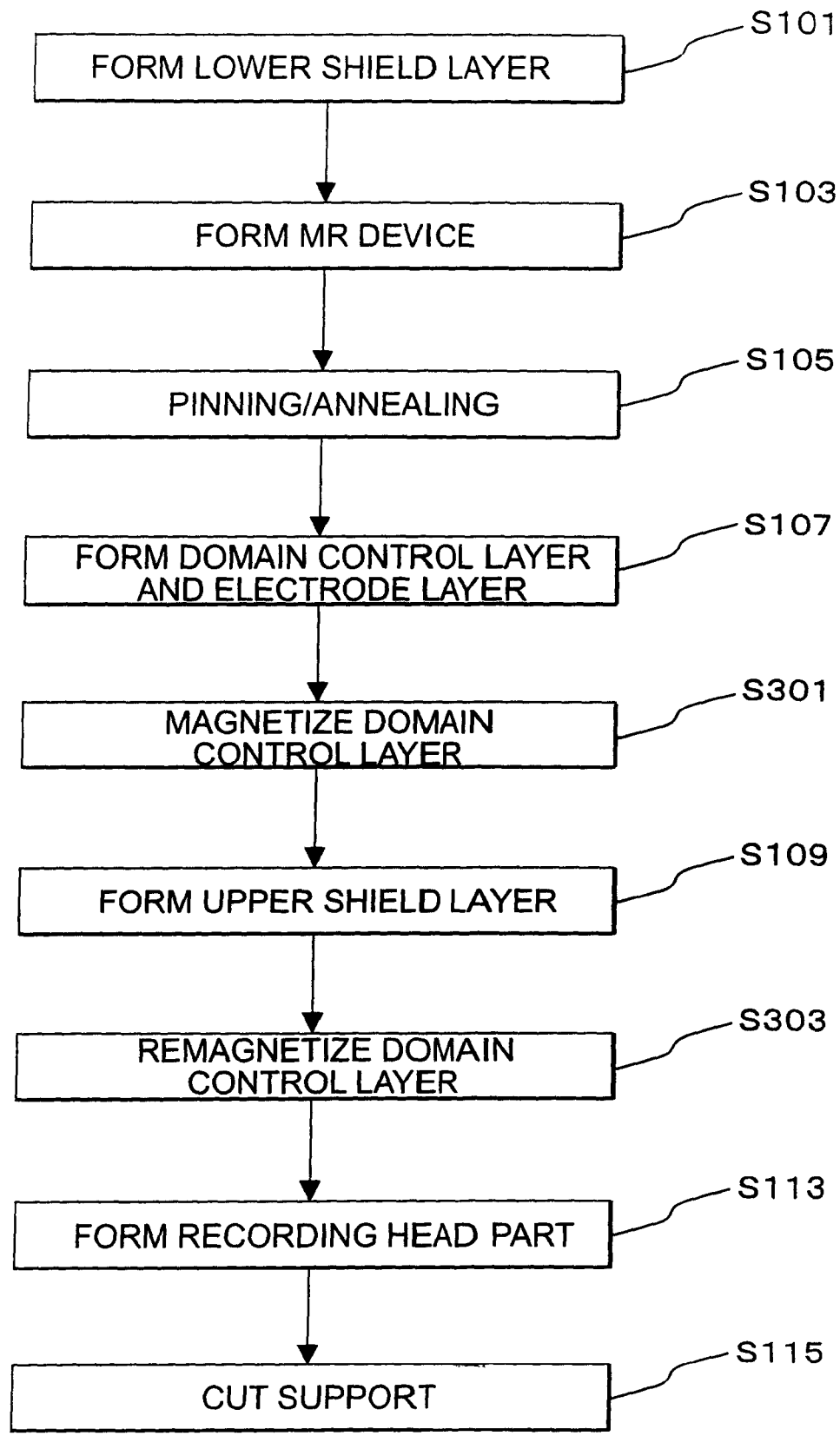
FIG. 6 is a flowchart for explaining an example of the method of manufacturing a thin-film magnetic head in accordance with the embodiment.

In this example, as shown in FIG. 6, the domain control layer 39 is formed and then is magnetized in the same direction as with a magnetic field received by the pinned layer 33 upon exchange-coupling with the antiferromagnetic layer 31 (S301). The domain control layer 39 is magnetized by applying a predetermined magnetic field (e.g., at about 12 kOe) thereto in a direction (the same direction as with the magnetic field applied by pinning/annealing) orthogonal to the track width direction at room temperature.

Subsequently, the upper shield layer 26 is formed (S109).

Then, the domain control layer 39 is remagnetized in a direction yielding a longitudinal bias magnetic field (S303). The domain control layer 39 is remagnetized by applying a predetermined magnetic field (e.g., at about 12 kOe) thereto in a track width direction at room temperature.

Thereafter, the recording head part 12 is formed (S113), and the support 2 in which a plurality of thin-film magnetic heads 1 are arranged in a matrix is cut into a plurality of bars 3 each comprising a plurality of thin-film magnetic heads 1 arranged integrally (S115). Subsequent manufacturing steps are totally the same as those in the conventional cases.

Figure 8:
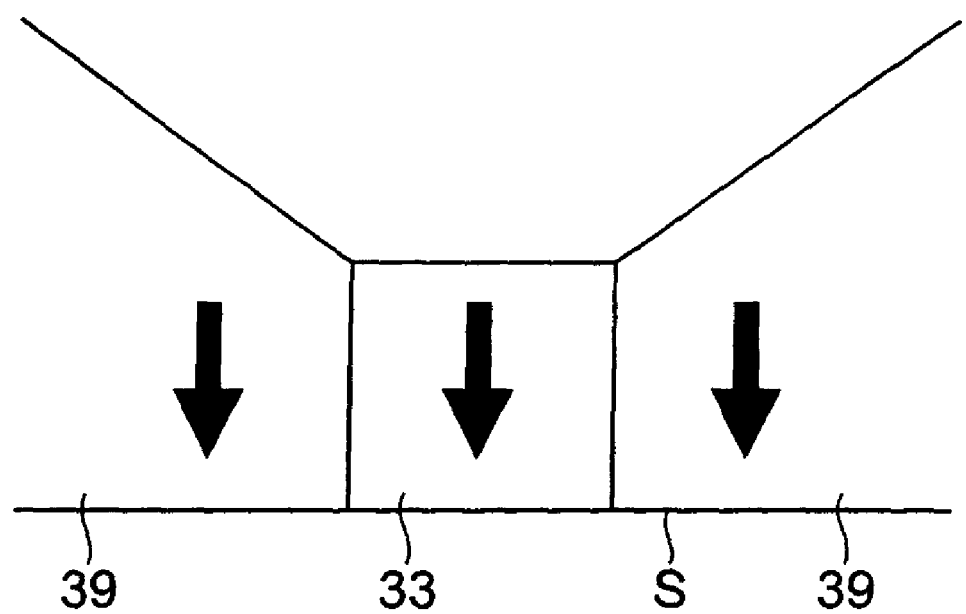
FIG. 8 is a schematic view for explaining the directions of magnetic fields in a pinned layer and a domain control layer.

In the manufacturing method mentioned above, exchange coupling is provided between the antiferromagnetic layer 31 and pinned layer 33, whereas the domain control layer 39 is magnetized in the same direction as with a magnetic field (exchange-coupling magnetic field) received by the pinned layer 33 upon exchange-coupling with the antiferromagnetic layer 31. Therefore, the magnetic field from the domain control layer 39 and the exchange-coupling magnetic field received by the pinned layer 33 are oriented in the same direction as shown in FIG. 8. This can prevent the direction of the exchange-coupling magnetic field received by the pinned layer 33 from being disturbed even when heat treatment is carried out at a temperature near the blocking temperature or higher.

In the manufacturing method mentioned above, the domain control layer 39 is remagnetized in a direction yielding a longitudinal bias magnetic field after the upper shield layer 26 is formed and before the recording head part 12 is formed. Therefore, the longitudinal bias magnetic field from the domain control layer 39 is weakened by the lower shield layer 23 and the upper shield layer 26, so as to become less influential on the MR device 10. This can prevent the direction of the exchange-coupling magnetic field received by the pinned layer 33 from being disturbed even when heat treatment is carried out at a temperature near the blocking temperature or higher in the step of forming the recording head part 12 while in the state where the domain control layer 39 is formed and magnetized.

Figure 7:
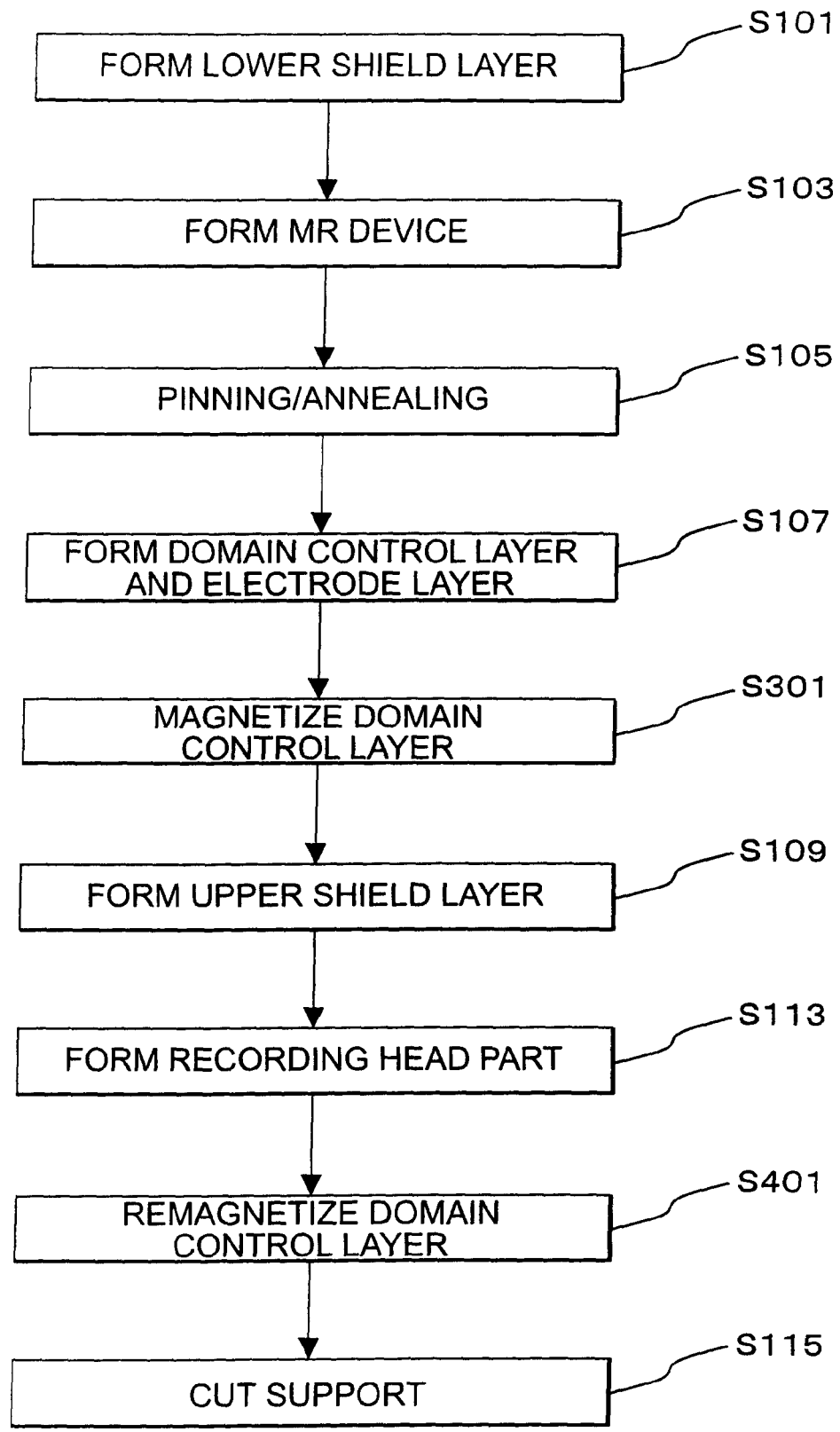
FIG. 7 is a flowchart for explaining an example of the method of manufacturing a thin-film magnetic head in accordance with the embodiment.

Next, with reference to FIG. 7, another example of method of manufacturing the thin-film magnetic head 1 will be explained. The steps identical to those in the method shown in FIG. 6 will not be explained.

In this example, the domain control layer 39 is remagnetized in a direction yielding a longitudinal bias magnetic field (S401) after the recording head part 12 is formed. The domain control layer 39 is remagnetized by applying a predetermined magnetic field (e.g., at about 12 kOe) thereto in a track width direction at room temperature.

Then, the support 2 in which a plurality of thin-film magnetic heads 1 are arranged in a matrix is cut into a plurality of bars 3 each comprising a plurality of thin-film magnetic heads 1 arranged integrally (S115). Subsequent manufacturing steps are totally the same as those in the conventional cases.

In the manufacturing method mentioned above, the domain control layer 39 is remagnetized in a direction yielding a longitudinal bias magnetic field after the upper shield layer 26 is formed and before the support 2 is cut into the bars 3. Hence, the domain control layer 39 is remagnetized after heat treatment operations (the heat treatment for preventing the electrode layers 45 from causing electromigration, the process of thermally curing the resist in the step of forming the recording head part 12, etc.) at a temperature near the blocking temperature or higher. This can reliably prevent the direction of the exchange-coupling magnetic field received by the pinned layer 33 from being disturbed.

The manufacturing methods shown in FIGS. 4 to 7 can yield the thin-film magnetic head 1 with an increased reproducing output, since the direction of the exchange-coupling magnetic field received by the pinned layer 33 can be prevented from being disturbed. Also, the IrMn alloy whose blocking temperature is lower than that of the PtMn alloy can be used as a material for the antiferromagnetic layer 31, whereby the thin-film magnetic head 1 (reproducing head part 11) can attain a narrower gap.

The thin-film magnetic heads 1 produced according to the manufacturing methods illustrated by FIGS. 4 to 7 were tested in order to determine an effect of yielding a higher reproducing output by:

(1) magnetizing the domain control layer 39 in a direction yielding a longitudinal bias magnetic field after forming the upper shield layer 26; and (2) magnetizing the domain control layer 39 in the same direction as with a magnetic field received by the pinned layer 33 upon exchange-coupling with the antiferromagnetic layer 31, and remagnetizing the domain control layer 39 in a direction yielding a longitudinal bias magnetic field after forming the upper shield layer 26.

In the test, a predetermined sense current (at 3 mA) was caused to flow through a plurality of thin-film magnetic heads (MR devices) manufactured in the following Examples 1 to 3 and Comparative Examples 1 to 3, and ohmic values of the thin-film magnetic heads and peak output characteristics of the MR devices at that time were measured.

The configuration of the MR devices and the like in Examples 1 to 3 and Comparative Example 1 was NiCr 50/IrMn 70/CoFe 15/Ru 8/CoFe 20/Cu 19/CoFe 20/Ru 5/Ta 20 (where the unit of values is Å). The configuration of the domain control layers was CrTi 50/CoCrPt 250 (where the unit of values is Å). The configuration of the electrode layers was Ta 50/Au 500/Ta 50 (where the unit of values is Å). The upper shield layer in each sample was constituted by an NiFe plating film having a thickness of 3.5 μm. The optical track width was 0.14 μm on average.

The configuration of the MR devices and the like in Comparative Examples 2 and 3 was NiCr 50/PtMn 170/CoFe 15/Ru 8/CoFe 20/Cu 19/CoFe 20/Ru 5/Ta 20 (where the unit of values is Å). The domain control layers, electrode layers, and upper shield layers were configured as in Examples 1 to 3 and Comparative Example 1.

EXAMPLE 1

According to the manufacturing method shown in FIG. 5, after forming the recording head part, the domain control layer was magnetized in a direction yielding a longitudinal bias magnetic field.

EXAMPLE 2

Figure 4:
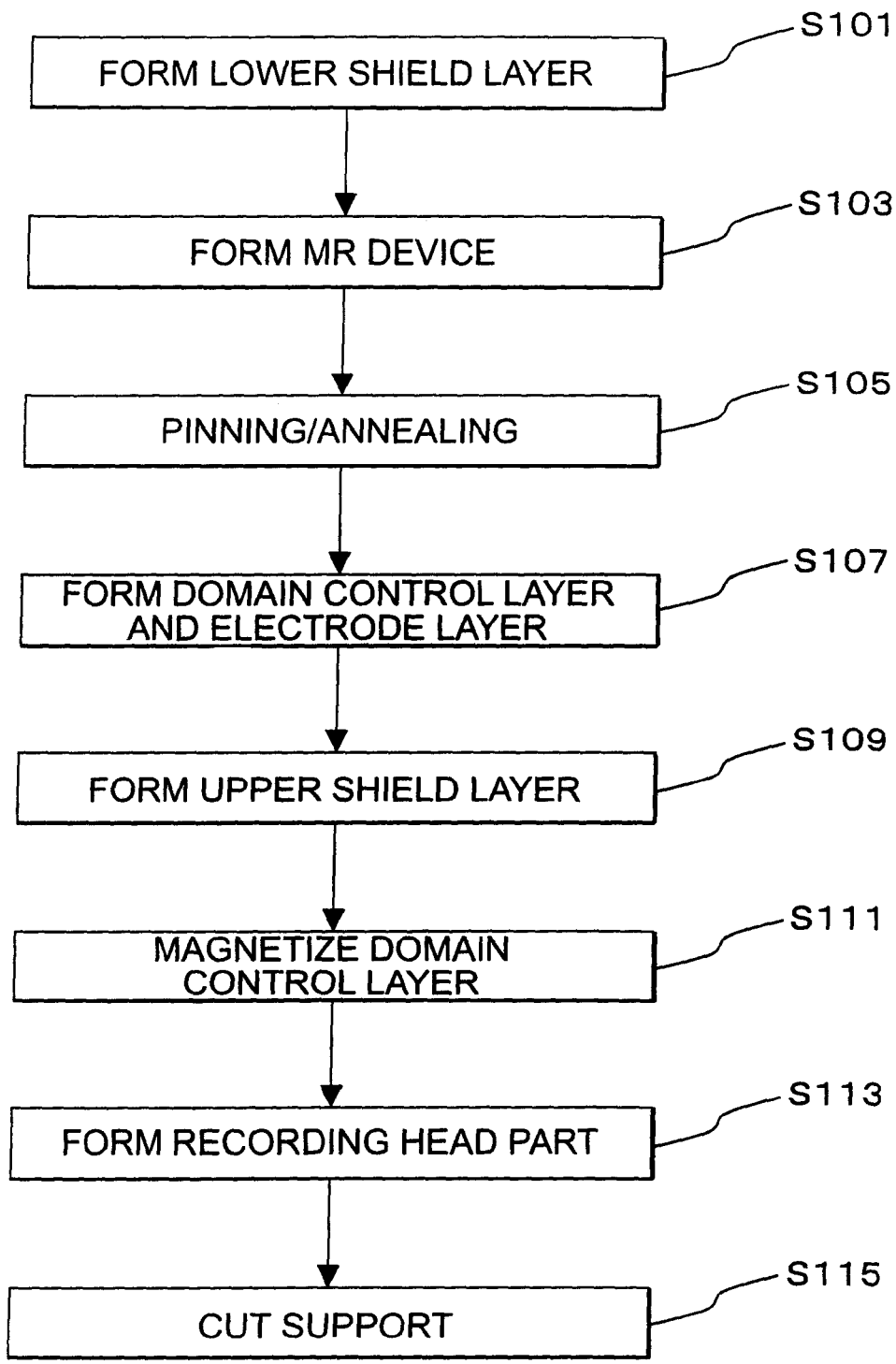
FIG. 4 is a flowchart for explaining an example of the method of manufacturing a thin-film magnetic head in accordance with the embodiment.

According to the manufacturing method shown in FIG. 4, after forming the upper shield layer and before forming the recording head part, the domain control layer was magnetized in a direction yielding a longitudinal bias magnetic field.

EXAMPLE 3

According to the manufacturing method shown in FIG. 6, the domain control layer was magnetized in a direction yielding a magnetic field in the same direction as with a magnetic field received by the pinned layer upon exchange-coupling with the antiferromagnetic layer, and then was remagnetized in a direction yielding a longitudinal bias magnetic field after forming the upper shield layer.

COMPARATIVE EXAMPLE 1

The domain control layer was magnetized in a direction yielding a longitudinal bias magnetic field before forming the upper shield layer.

COMPARATIVE EXAMPLE 2

The domain control layer was magnetized in a direction yielding a longitudinal bias magnetic field before forming the upper shield layer. Here, the material for the antiferromagnetic layer was the PtMn alloy as mentioned above.

COMPARATIVE EXAMPLE 3

The domain control layer was magnetized in a direction yielding a longitudinal bias magnetic field after forming the recording head part. Here, the material for the antiferromagnetic layer was the PtMn alloy as mentioned above.

Figure 9:
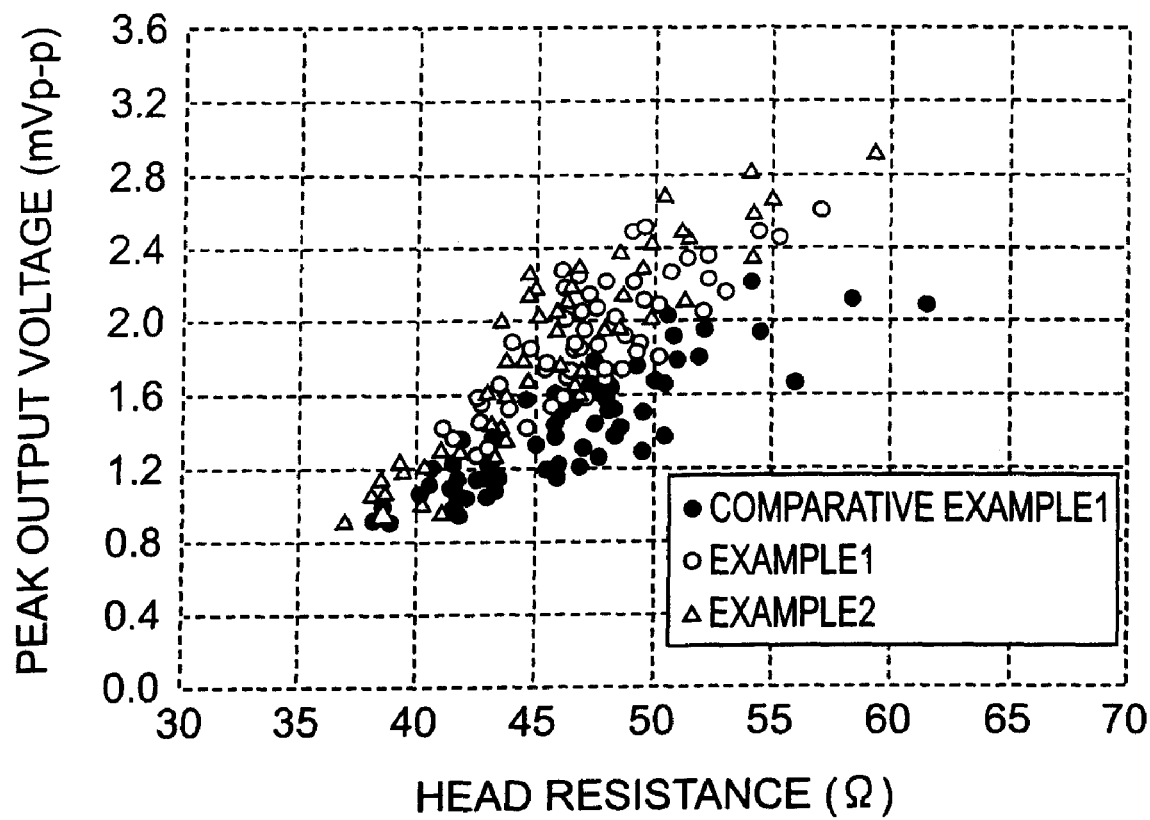
FIG. 9 is a chart showing peak output voltage characteristics of MR devices with respect to ohmic values of thin-film magnetic heads in Examples 1 and 2 and Comparative Example 1.
Figure 10:
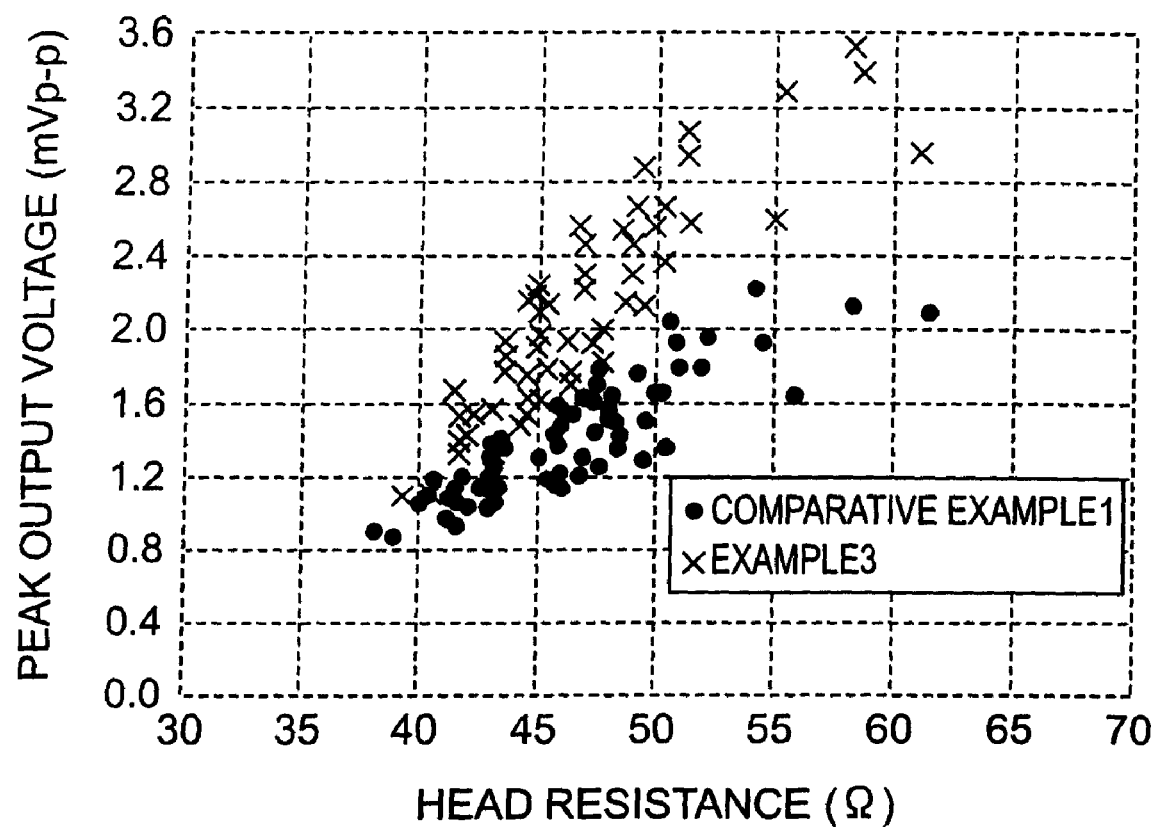
FIG. 10 is a chart showing peak output voltage characteristics of MR devices with respect to ohmic values of thin-film magnetic heads in Example 3 and Comparative Example 1.
Figure 11:
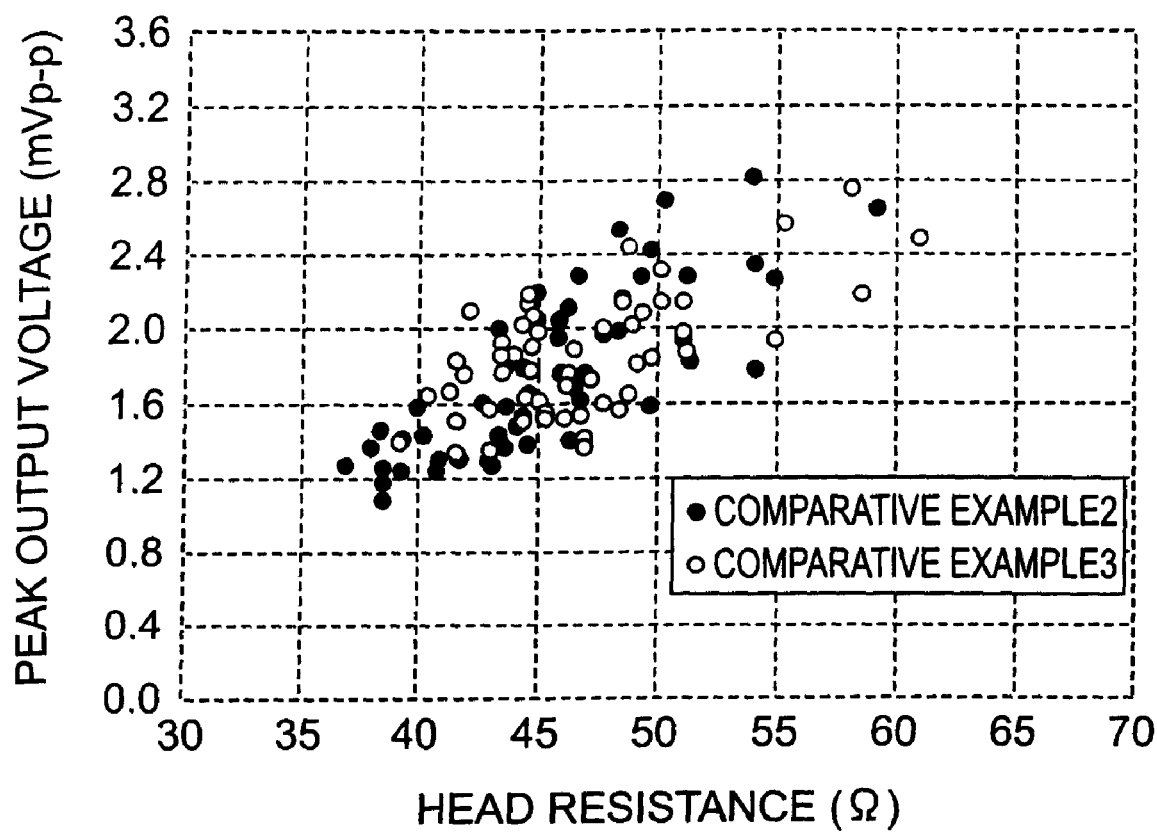
FIG. 11 is a chart showing peak output voltage characteristics of MR devices with respect to ohmic values of thin-film magnetic heads in Comparative Examples 1 and 2.

FIG. 9 shows results of measurement in Examples 1 and 2 and Comparative Example 1. FIG. 10 shows results of measurement in Example 3 and Comparative Example 1. FIG. 11 shows results of measurement in Comparative Examples 2 and 3.

As can be seen from the measurement results shown in FIG. 9, peak output voltages are higher in Examples 1 and 2 than in Comparative Example 1. As can be seen from the measurement results shown in FIG. 10, peak output voltages are much higher in Example 3 than in Comparative Example 1. On the other hand, as can be seen from the measurement results shown in FIG. 11, no significant difference exists between Comparative Examples 2 and 3 when the antiferromagnetic layer is made of PtMn. The effectiveness of this embodiment was verified from the foregoing.

The present invention is not limited to the above-mentioned embodiment. For example, each layer is not required to be formed from a single material, but may comprise a plurality of materials as long as they can exhibit a predetermined function as a whole. For instance, each layer may be an alloy, a mixture, or a combination of layer structures. Between these layers, other layers may be interposed as well.

Though the thin-film magnetic head 1 comprises the reproducing head part 11 and the recording head part 12 in the embodiment, the reproducing head part 11 may be provided alone.

The material for the antiferromagnetic layer 31 is not limited to the IrMn alloy, but may be an RuRhMn alloy, etc.

As explained in terms of the preferred embodiment in the foregoing, the present invention can provide a method of manufacturing a thin-film magnetic head which can prevent the direction of the exchange-coupling magnetic field from being disturbed and achieve a higher reproducing output even when a material having a low blocking temperature is used in the antiferromagnetic layer included in the MR device.

What is claimed is:

1. A method of manufacturing a thin-film magnetic head comprising a magnetoresistive device including an antiferromagnetic layer, a ferromagnetic layer having a direction of magnetization that is fixed upon exchange-coupling with the antiferromagnetic layer, a free layer having a direction of magnetization that changes in response to external magnetization, and a nonmagnetic layer disposed between the ferromagnetic layer and the free layer; a domain control layer for regulating a magnetic domain of the free layer by applying a longitudinal bias magnetic field thereto; and first and second shield layers being disposed so as to oppose each other by way of the magnetoresistive device for shielding the magnetoresistive device;

the method comprising:

forming the first shield layer;

forming the magnetoresistive device after forming the first shield layer;

a heat treatment providing exchange coupling between the ferromagnetic layer and the antiferromagnetic layer so as to magnetize the ferromagnetic layer in a direction orthogonal to a track width direction;

forming the domain control layer so as to hold the magnetoresistive device in the track width direction;

magnetizing the domain control layer in a direction yielding a magnetic field in the direction orthogonal to the track width direction;

forming the second shield layer after magnetizing the domain control layer; and remagnetizing the domain control layer in a direction yielding the longitudinal bias magnetic field by applying a magnetic field to the domain control layer in the track width direction after forming the second shield layer.

2. The method of manufacturing a thin-film magnetic head according to claim 1, further comprising forming a recording head part;

wherein remagnetizing the domain control layer is carried out prior to forming the recording head part.

3. The method of manufacturing a thin-film magnetic head according to claim 1, wherein a plurality of thin-film magnetic heads are formed so as to be arranged in a matrix on a wafer;

wherein the method further comprises cutting the wafer into a plurality of bars each comprising a plurality of thin-film magnetic heads arranged integrally; and wherein remagnetizing the domain control layer is carried out prior to cutting the wafer.

4. A method of manufacturing a thin-film magnetic head according to claim 1, wherein the antiferromagnetic layer comprises an IrMn alloy.

5. The method of manufacturing a thin-film magnetic head according to claim 1, further comprising forming a recording head part;

wherein remagnetizing the domain control layer is carried out after forming the recording head part.

* * * * *